United States Patent
Song (10) Patent No.: US 7,106,524 B2
(45) Date of Patent: Sep. 12, 2006

(54) OPTICAL PICKUP APPARATUS FOR READ-WRITE HEADS IN HIGH DENSITY OPTICAL STORAGES

(76) Inventor: Tae-Sun Song, 305-65, Kwangmyung-dong, Kwangmyung-city, Kyung-ki-do (KR) 423 804

(*) Notice: Subject to any disclaimer, the term of this patent is extended or adjusted under 35 U.S.C. 154(b) by 0 days.

(21) Appl. No.: 10/416,739

(22) PCT Filed: Nov. 14, 2001

(86) PCT No.: PCT/KR01/01943
§ 371 (c)(1),
(2), (4) Date: May 12, 2003

(87) PCT Pub. No.: WO02/41309
PCT Pub. Date: May 23, 2002

(65) Prior Publication Data
US 2004/0036980 A1  Feb. 26, 2004

(30) Foreign Application Priority Data
Nov. 15, 2000 (KR) .............. 2000-67760
Feb. 23, 2001 (KR) .............. 2001-9333

(51) Int. Cl.
G02B 13/18 (2006.01)
G02B 3/02 (2006.01)
G11B 7/00 (2006.01)
G11B 7/135 (2006.01)

(52) U.S. Cl. .............. 359/719; 369/112.23
(58) Field of Classification Search .............. 359/619, 359/620, 626, 628, 642, 708, 709, 719, 720; 369/44.11, 112.23, 112.24
See application file for complete search history.

(56) References Cited

U.S. PATENT DOCUMENTS

| | | | |
|---|---|---|---|
| 6,181,478 B1* | 1/2001 | Mandella | 359/642 |
| 2001/0050896 A1* | 12/2001 | Hajjar et al. | 369/112.24 |
| 2004/0081061 A1* | 4/2004 | Matsuo | 369/112.24 |

FOREIGN PATENT DOCUMENTS

| | | |
|---|---|---|
| EP | 0 721 113 | 7/1996 |
| EP | 0 953 975 A2 | 3/1999 |
| JP | 60-121412 | 6/1985 |
| JP | 63-058310 | 3/1988 |
| JP | 63-239627 | 10/1988 |
| JP | 02-101416 | 4/1990 |
| JP | 03-196011 | 8/1991 |
| JP | 08-221790 | 8/1996 |
| JP | 10-092002 | 4/1998 |
| JP | 11045455 A | 2/1999 |
| JP | 11-339310 | 12/1999 |

* cited by examiner

Primary Examiner—Alicia M Harrington
(74) Attorney, Agent, or Firm—Marshall, Gerstein & Borun LLP (57) ABSTRACT

An optical pickup apparatus for recording or reproducing data on a signal recording surface of a high-density optical medium that has the signal recording surface and at least one substrate includes an optical module for generating and emitting beams and receiving reflected beams from an optical medium and a solid immersion lens (SIL) arranged on an optical path between the optical module and the optical medium, having a first surface being planar and facing the substrate of the optical medium, and a second surface being aspherical and facing the optical module, so that the SIL may be nearly in contact with the substrate of the optical medium.

17 Claims, 10 Drawing Sheets

PRIOR ART

FIG.11

PRIOR ART

OPTICAL PICKUP APPARATUS FOR READ-WRITE HEADS IN HIGH DENSITY OPTICAL STORAGES

CROSS-REFERENCE TO RELATED APPLICATIONS

This is the U.S. national phase of International Application No. PCT/KR01/01943 filed Nov. 14, 2001, the entire disclosure of which is incorporated herein by reference.

BACKGROUND OF THE INVENTION (a) Field of the Invention

The present invention relates to an optical pickup apparatus for recording or reproducing optical media such as optical disks, and more particularly, to an optical pickup apparatus that is close to an optical medium to obtain near-field effect for high density recording or reproduction.

(b) Description of the Related Art

Recently, optical media such as optical and magneto-optical discs have been developed to have high-density storage, to be used for computer storage, package media for music and images, and so forth. In order to obtain high-density storage, it is desirable to reduce the light spot size of the optical pickup apparatus. The light spot size is proportional to the wavelength of the light, and inversely proportional to the numerical aperture of an objective lens system. Therefore, many proposals to reduce the wavelength of the light as well as to increase the numerical aperture of the objective lens system have been suggested.

Figure 10:
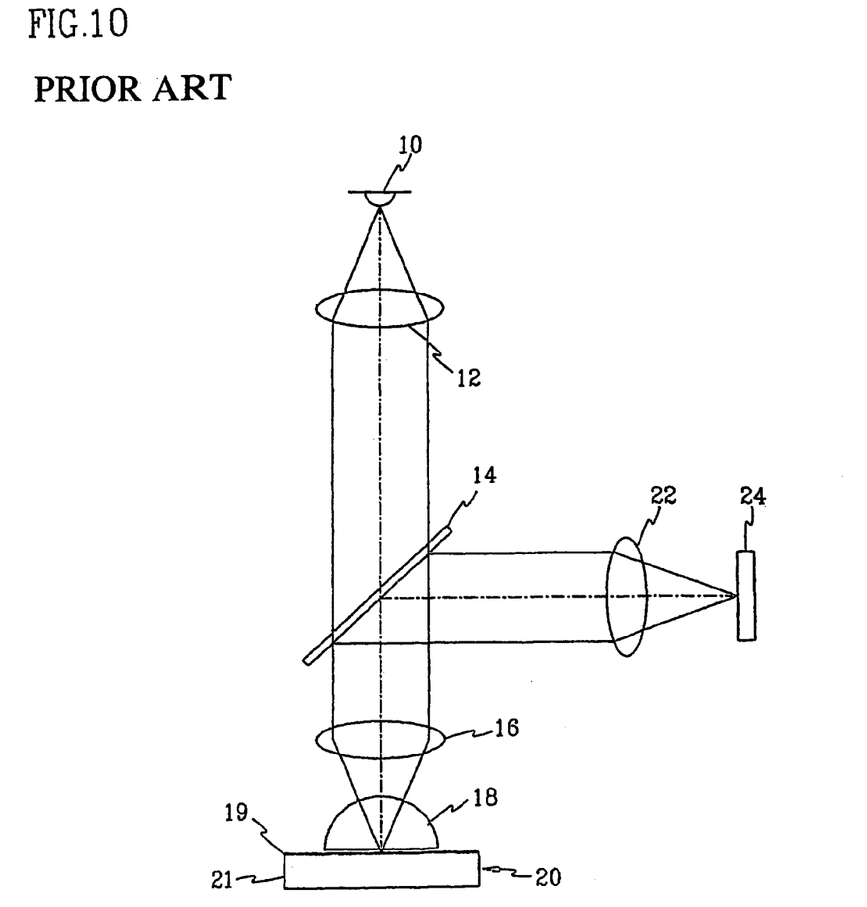
FIG. 10 shows a prior art optical pick apparatus in which light directly enters a signal recording surface of an optical disc.

In order to increase the numerical aperture of the objective lens system, a proposal suggested in U.S. Pat. No. 5,125,750 uses a solid immersion lens (SIL) that may come close to a signal recording surface of the optical disc, as shown in FIG. 10. In the pickup apparatus of FIG. 10, a light source 10 of a laser diode generates laser beams that pass though a collimator lens 12 to become collimated beams. The collimated beams pass through a beamsplitter 14 and then enter an objective lens system having a condenser objective lens 16 and a SIL 18. The condenser objective lens 16 condenses the collimated light onto the SIL 18, and the SIL 18 functions to increase the numerical aperture to focus a light spot on a signal recording surface 19. The light then diffracts and reflects from the signal recording surface 19 back to the SIL 18, the condenser objective lens 16, and the beamsplitter 14. The light is reflected from the beamsplitter 14, it passes through the field lens 22, and then enters into a photodetector 24. The photodetector 24 demodulates the beams to reproduce the original signals.

The light is focused, through the condenser objective lens 16 and the SIL 18, into a light spot having a diameter d that is defined as follows:

$$d \sim w/(NA*n) = w/NA_{\textit{eff}}$$

where w is a wavelength of the light, NA is a numerical aperture of the condenser objective lens system in air, $NA_{\textit{eff}}$ is an effective numerical aperture, and n is a refractive index of the SIL. The effective numerical aperture $NA_{\textit{eff}}$ is large resulting in very small light spot when an optical material having a large refractive index (generally 2.0 or larger) is used for a SIL.

However, since the prior art optical pickup apparatus use a SIL facing the signal recording surface 19 of the optical disc 20, the SIL 18 may collide with the optical disc 20, thereby allowing destruction of the signal recording surface. Further, it is highly possible for the apparatus or the optical disc to suffer chemical or physical deformation due to high heat caused by light spot radiation.

Figure 11:
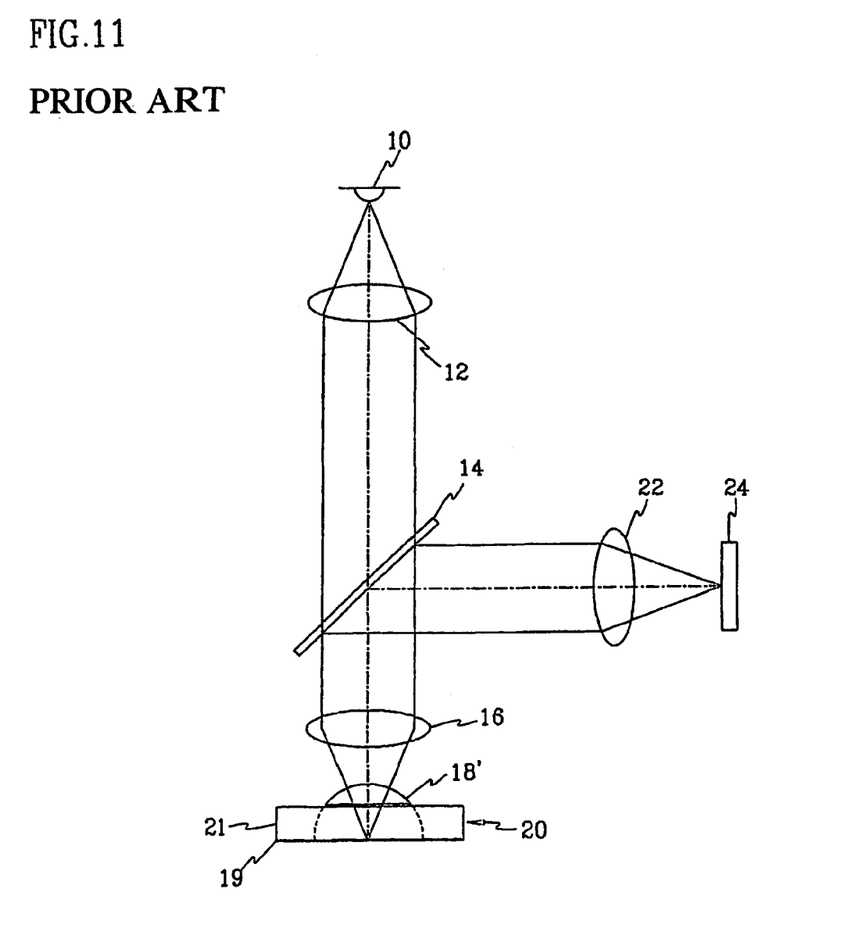
FIG. 11 shows a prior art optical pick apparatus in which light enters a signal recording surface through a substrate of an optical disc.

In order to overcome the above drawbacks, an optical pickup apparatus that collects light from a signal recording surface through a substrate of an optical recording medium has been proposed in Japanese Laid-open Publication No. JP8-221790. In the optical pickup apparatus that is as shown in FIG. 11, a SIL 18' faces toward a substrate 21 of an optical disc 20, rather than a signal recording surface 19. The SIL 18' has a planar surface facing the substrate 21, and a semi-spherical surface facing the condenser objective lens 16. A center of the semi-sphere lies on the signal recording surface 19 of the optical disc 20. Therefore, light, which has passed through the condenser objective lens 16, is focused on the signal recording surface 19 through the substrate 21 of the optical disc 20 by the SIL 18'.

The optical pickup apparatus shown in FIG. 11, however, has a restriction in that the SIL 18' has the same refractive index as the substrate with in range of 1.5–1.55. SILs are generally made of highly refractive material having a refractive index of about 2.0, but the SIL 18' as shown in FIG. 11 has a refractive index of 1.5–1.55, which is less than the desired refractive index, so it is difficult to obtain a high storage density.

The conventional optical pickup apparatus as shown in FIG. 10 or 11 additionally has a condenser objective lens 16 before the SIL 18 or 18', so that the apparatus becomes larger and more complex. Further, since the apparatus may be used under the condition that the refractive index of the SIL is the same as that of the substrate of the optical disc, it causes large aberrations of optics resulting in a degradation of the apparatus, as well as restriction in refractive material of the SIL.

SUMMARY OF INVENTION

In view of the prior art described above, it is an object of the present invention to provide an optical pickup apparatus for a read/write optical head that has a single solid immersion lens as an objective lens system, thereby becoming simple and compact.

It is another object of the present invention to provide an optical pickup apparatus for a read/write optical head using an aspherical solid immersion lens facing a substrate of an optical recording medium, thereby enhancing durability of the apparatus as well as minimizing a light spot on the optical medium, and being easily manufactured and used.

To achieve the abovementioned objects, as embodied and broadly described herein, the invention comprises a optical module for generating and emitting beams and receiving reflected beams from an optical medium; and a solid immersion lens (SIL) arranged on an optical path between the optical module and the optical medium, having a first surface being planar and facing the substrate of the optical medium, and a second surface being aspherical and facing the optical module, so that the SIL may be nearly in contact with the substrate of the optical medium.

The beams from the optical module enter the SIL, and are then focused through the substrate onto the signal recording surface without a condenser objective lens. When collimated beams are used which are emitted from the optical module and a refractive index of the SIL is identical with that of the substrate of the optical recording medium, the second surface of the SIL is an ellipsoidal surface. When divergent beams are used which are emitted from the optical module and a refractive index of the SIL is identical with that of the substrate of the optical recording medium, the second surface of the SIL is a Cartesian oval.

DETAILED DESCRIPTION OF THE PREFERRED EMBODIMENTS

The present invention will be described in detail with reference to the accompanying drawings. The present invention is intended to read or write information on various optical recording media such as compact discs (CDs), digital versatile discs (DVDs), mini discs (MDs), and magneto-optical discs, but it will be explained for an optical pickup apparatus for reading information from a high density optical disc on which information has already been written, for the purpose of easy explanation.

Figure 1:
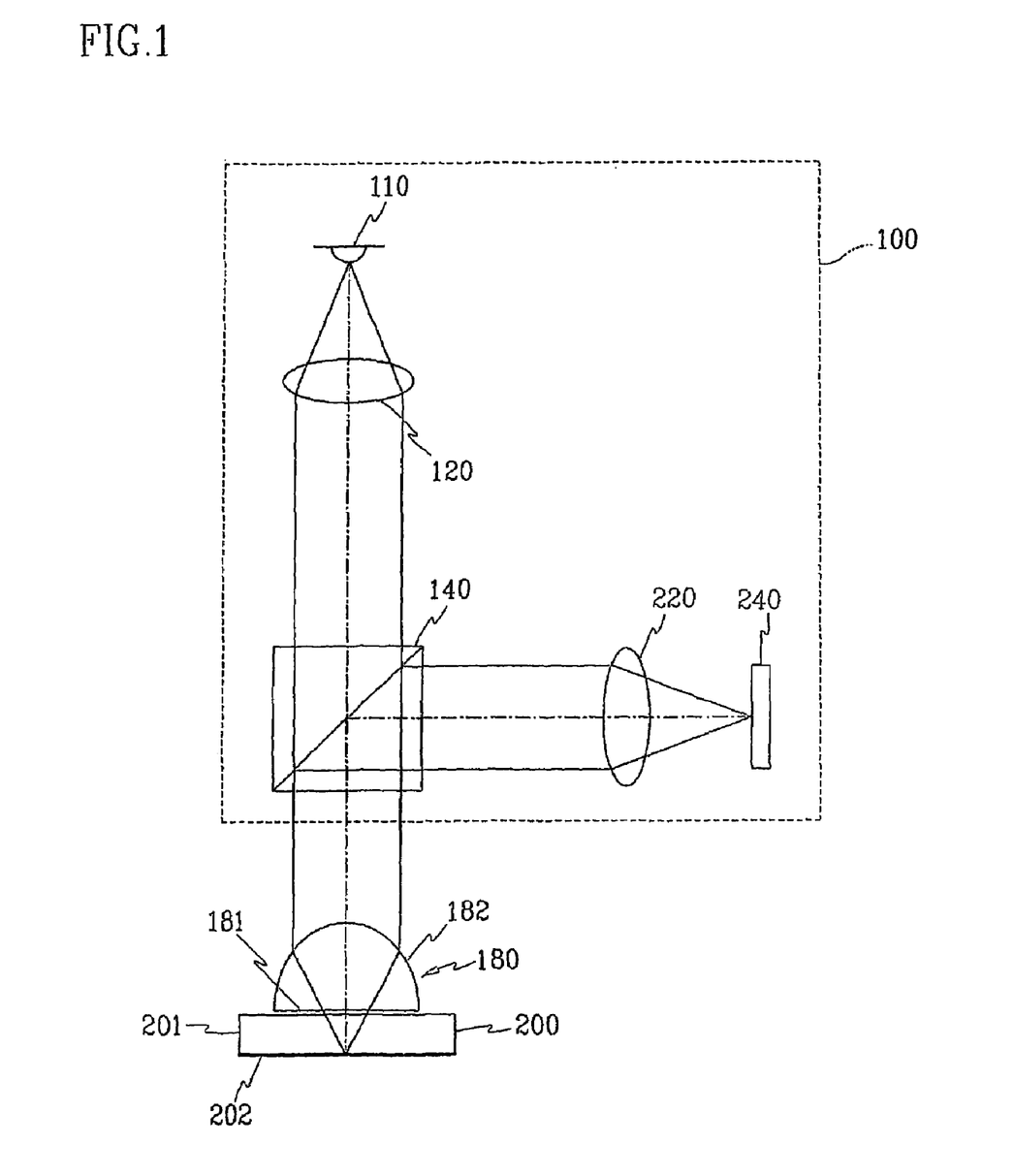
FIG. 1 shows a first preferred embodiment of the present invention.

Referring first to FIG. 1, an optical pickup apparatus according to the first preferred embodiment of the present invention is shown. The optical pickup apparatus comprises optical elements that may be depicted as parts of an optical module 100, such as a laser diode for a light source 110, a collimator lens 120, a beam splitter 140, a field lens 220, and a photodetector 240. Light beams emitted from the laser diode 110 are collimated by the collimator lens 120. The optical module 100 is similar to a prior art as shown in FIG. 10 or 11, but the optical pickup apparatus shown in FIG. 1 only has a SIL 180 as an objective lens system, and it is placed on an optical path between the optical module 100 and an optical disc 200.

The SIL 180 has a first surface 181 that is a plane and faces a substrate 201 of the optical disc 200 and is closely spaced therefrom, and a second surface 182 that is curved and faces the optical module 100.

The SIL 180 can be generally made of an optical material having a refractive index that is different from that of the substrate 201 of the optical disc. The material of the SIL 180 is preferably selected, however, from optical materials whose refractive index is the same to the substrate 201.

Figure 2:
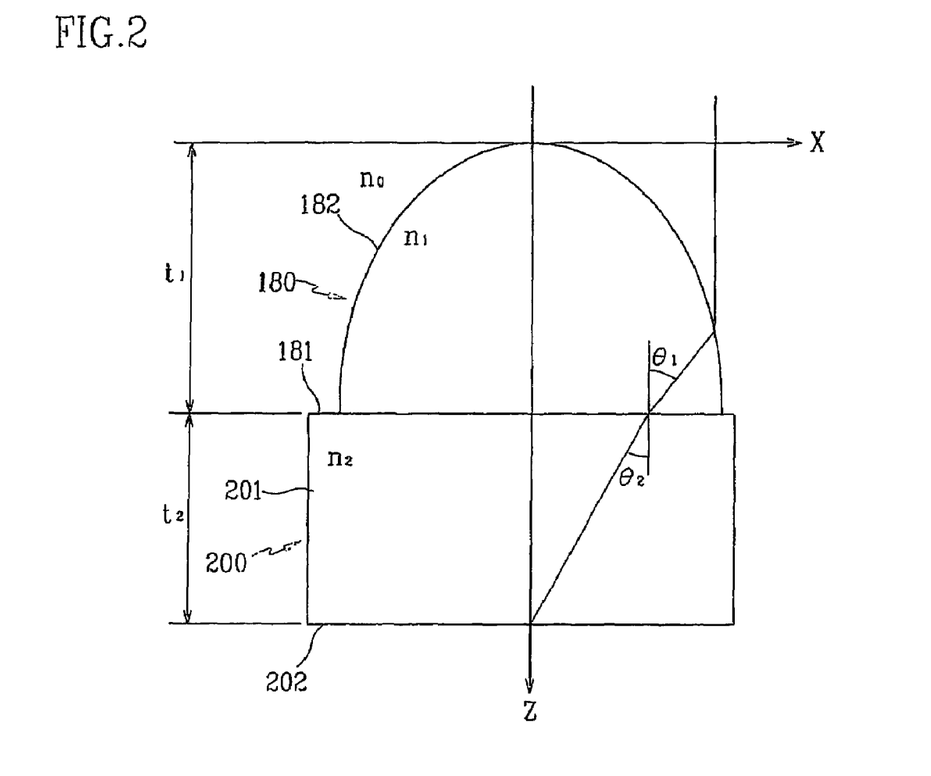
FIG. 2 illustrates an optical path of a ray in a solid immersion lens (SIL) and an optical disc of FIG. 1.

Referring now to FIG. 2, a general case in which the refractive index of the SIL is different from that of the substrate 201 of the optical disc will be described. Let us assume that an optical axis of the SIL 180 is designated a z-axis, as shown in FIG. 2, and a radial direction normal to the optical axis is designated an x-axis. When an optical path of a ray that is incident to the second surface 182 in the optical axis is the same as an optical path of another ray that enters parallel to the optical axis in an arbitrary radius (z, x), a point image is formed from the parallel beams. Therefore, a coordinate (z, x) in the second surface 182 of the SIL 180 satisfies the following Formulas 1 and 2, where n0, n1, and n2 are refractive indices of air, the SIL 180, and the substrate 201 of the optical disc 200, respectively; θ1 and θ2 are incident angles to the first surface 181 of the SIL and the signal recording surface 202 through the SIL 180, respectively; and t1 and t2 are thicknesses of the SIL 180 and the substrate 201, respectively. Although the formulas are represented by two-dimensional equations herein for the purpose of easy explanation, it is obvious for those ordinarily skilled in the art to make three-dimensional formulas by substituting $x^2$ to $x^2+y^2$.

$$n0z + \frac{n1(t1-z)}{\cos\theta 1} + \frac{n2t2}{\cos\theta 2} = n1t1 + n2t2 \qquad \text{FORMULA 1}$$

where $$\theta 1 = \sin^{-1}\left(\frac{n2\sin\theta 2}{n1}\right) \quad \theta 1, \theta 2 < 90°$$

$$x = t2\tan\theta 2 + (t1-z)\tan\theta 1 \qquad \text{FORMULA 2}$$

Since a numerical aperture NA of the SIL is set to n2 sin θ2, it is possible to have a larger numerical aperture than one (1.0) by selecting a substrate material whose refractive index n2 is large. Therefore, a light spot on the signal recording surface 202 of the disc 200 is formed in a smaller size, so that the optical pickup apparatus according to the present invention may read/write information in higher density storage.

Meanwhile, the following Formulas 3 and 4 are obtained when Formulas 1 and 2 are arranged for z and x in terms of a parameter θ2.

$$z = \frac{n1t1\left(1 - \frac{1}{\cos(\sin^{-1}(nr\sin\theta 2))}\right) + n2t2\left(1 - \frac{1}{\cos\theta 2}\right)}{n0 - \frac{n1}{\cos(\sin^{-1}(nr\sin\theta 2))}} \qquad \text{FORMULA 3}$$

where $nr = n2/n1$.

$$x = t2\tan\theta2 + \left(t1 - \frac{n1t1\left(1 - \frac{1}{\cos(\sin^{-1}(nr\sin\theta2))}\right) + n2t2\left(1 - \frac{1}{\cos\theta2}\right)}{n0 - \frac{n1}{\cos(\sin^{-1}(nr\sin\theta2))}}\right)\tan(\sin^{-1}(nr\sin\theta2))$$ FORMULA 4

A maximum incident angle θ max to the substrate of the optical disc is obtained using Formula 4 when the effective radius of the SIL is xmax. The maximum numerical aperture is represented by n2 sin θ max, thereby being a function of the effective radius xmax.

For example, when the refractive index n1 and the thickness of the SIL are 1.75 and 1.2 mm, respectively, and the refractive index n2 and the thickness of the substrate are 1.52 and 1.2 mm (for CDs), the effective radius and numerical aperture of the SIL are about 1.33 mm and 1.12, respectively. For a substrate thickness of 0.6 mm, the effective radius and numerical aperture of the SIL are about 1.025 mm and 1.3, respectively. For a substrate thickness of 0.3 mm, the effective radius and numerical aperture of the SIL are about 0.79 mm and 1.42, respectively.

Therefore, it is noted that the possible numerical aperture of the SIL is less than the refractive index n2 of the substrate of the optical disc. It is also noted that the lesser the thickness of the substrate, the larger the numerical aperture of the SIL with the same effective radius of the SIL.

For the above case, the storage capacity of the optical disc is proportional to a square of the numerical aperture (NA), so that storage of over 20 GB may be obtained for a DVD system using a 650 nm-wavelength light source, and storage of over 50 GB may be obtained for a 405 nm-wavelength light source.

Next, the case in which a SIL is made of an optical material having the same refractive index n1 as the substrate of the optical disc n2, i.e., n=n2, will be described.

Figure 3:
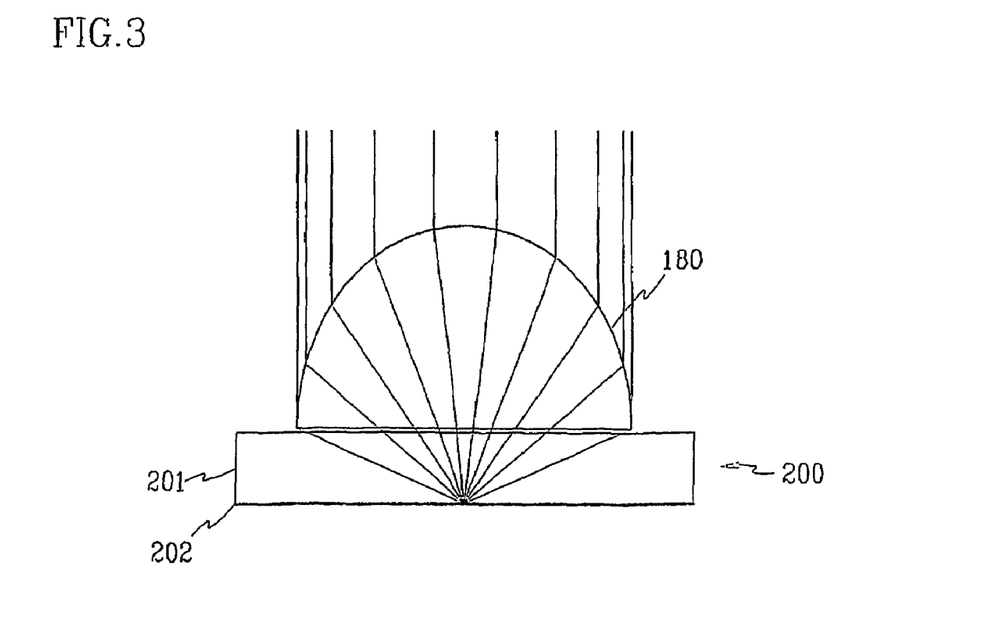
FIG. 3 illustrates optical paths in the SIL and the optical disc when a refractive index of the SIL is the same as that of the optical disc.

When the refractive index n1 of the SIL 180 is the same as that of the substrate 201 of the optical disc, an incident ray hardly refracts at the interface between the first surface 181 and the substrate 201 of the optical disc, thereby forming a light spot on the signal recording surface 202 of the optical disc as shown in FIG. 3. That is, when n1 is identical with n2, θ1 is identical with θ2, thereby resulting in Formula 5, as follows:

$$n0z + n1\sqrt{x^2 + (z-a)^2} = n1a \quad \text{FORMULA 5}$$

where a=t1+t2.

Formula 5 may be expressed as a conic equation, so that the second surface 182 of the SIL 180 is an ellipsoidal surface. Now, referring to FIG. 4, the ellipsoidal surface will be described.

Figure 4:
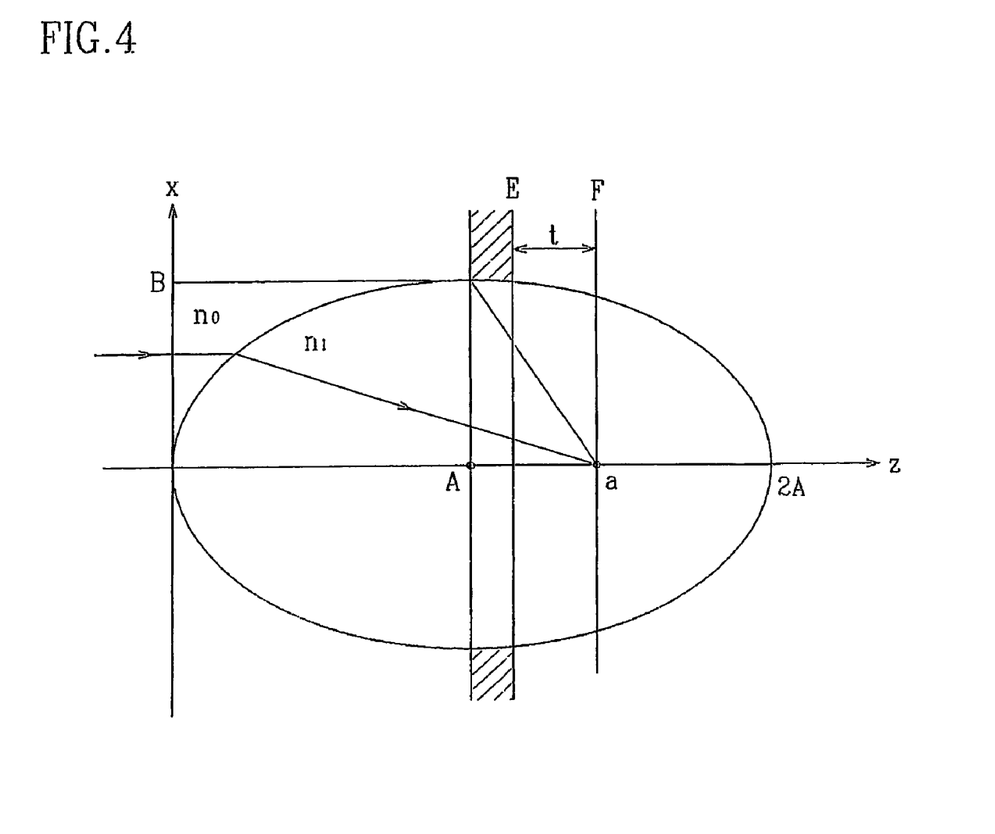
FIG. 4 shows an ellipsoidal surface of the SIL and coordinate axes of FIG. 3.

First, let's assume that a vertex of the ellipsoidal surface of the SIL 180 facing the optical module is an origin, the optical axis is a z-axis, a radial direction normal to the optical axis is an x-axis, an refractive index of the exterior is n0, a refractive index of the interior of the ellipse is n1, and a coordinate of an elliptical focus is a. The general equation of an ellipse is expressed by the following Formula 6. For the purpose of easy explanation, the formula is expressed as a two-dimensional equation, but those ordinarily skilled in the art may modify the formula to be three-dimensional, simply by substituting $x^2+y^2$ for $x^2$.

$$\frac{\left(z - a\frac{n1}{n1+n0}\right)^2}{\left(a\frac{n1}{n1+n0}\right)^2} + \frac{x^2}{a^2\frac{n1-n0}{n1+n0}} = 1 \quad \text{FORMULA 6}$$

(See R. K. Luneburg, Mathematical Theory of Optics, pp 132–134)

When a semi-major axis of the ellipse is A, and a semi-minor axis of the ellipse is B, an equation for a general ellipse is defined as follows:

$$\frac{(z-A)^2}{A^2} + \frac{x^2}{B^2} = 1 \quad \text{FORMULA 7}$$

The second surface 182 of the SIL 180 has a semi-major axis A and a semi-minor axis B that are given as follows:

$$A = a\frac{n1}{n1+n0}, B = a\sqrt{\frac{n1-n0}{n1+n0}} \quad \text{FORMULA 8}$$

where an eccentricity e of the ellipse is given by Formula 9.

$$e = a\frac{n0}{n1+n0} \quad \text{FORMULA 9}$$

Therefore, the ellipsoidal surface of the SIL 180 may be formed according to the refractive index n1 and the focal length of the ellipse.

In the meantime, an aspherical surface is generally expressed by the following general equation.

$$z = \frac{cx^2}{1 + \sqrt{1 - (k+1)c^2x^2}} + Dx^4 + Ex^6 + Fx^8 + \ldots \quad \text{FORMULA 10}$$

where c represents a curvature of the surface, x represents a radius from a z-axis, k represents a Conic constant, and D, E, F . . . represent fourth, sixth, and eighth (and so forth) aspherical coefficients, respectively.

When the second surface 182 of the SIL 180 is an ellipsoidal surface and is expressed by the Formula 10, curvature c and conic constant k are expressed by the following Formula 11. The other aspherical coefficients (D, E, F . . . ) are zero.

$$c = \frac{n1}{a(n1-n0)}, k = -\frac{n0^2}{n1^2} \quad \text{FORMULA 11}$$

Next, the first surface 181 of the SIL 180 is placed on the plane E, as shown in FIG. 4, which passes by the point (a-t) and is parallel to the x-axis, since the signal recording surface 202 of the optical disc 200 is set to the plane F, as shown in FIG. 3, which passes by the point a and is parallel to the x-axis.

The second surface (ellipsoidal surface) of the optical disc is defined by Formula 6 or Formulas 10 and 11 when the refractive index and thickness of the substrate of the optical disc are n1 and t, respectively. Further, the thickness of the SIL becomes (a-t).

Therefore, light beams that enter in parallel into the SIL 180 having the aforementioned shape are exactly focused on the signal recording surface 202 on which the focus a of the ellipse lies.

The maximum numerical aperture $NA_{max}$ of the SIL 180 is defined as follows:

$$NA_{max} = n1 \frac{B}{\sqrt{e^2+B^2}} = \sqrt{n1^2 - n0^2} \quad \text{FORMULA 12}$$

Accordingly, the effective numerical aperture NA of the SIL 180 has a value that ranges within $NA \leq NA_{max}$.

For example, in the case of n1=1.55, n0=1.0, the maximum value of the effective numerical aperture $NA_{max}$ becomes about 1.184, while in the case of n1=1.50, n0=1.0, the maximum value of the effective numerical aperture $NA_{max}$ becomes about 1.118, thereby obtaining a higher effective numerical aperture than that of the prior art.

A lens holder for holding the SIL 180 supports its periphery at an area between a vertex on the minor axis of the ellipsoidal surface (the second surface) and the surface E (hatched portion of FIG. 4), so that the effectiveness of the light may be maximized.

Storage capacity is inversely proportional to the square of the light spot size. In the case that a red laser diode (wavelength 650 nm) is used for a light source in a DVD media system, high density data of about 18 GB storage may be read or written. For a blue laser diode (wavelength 405 nm), higher density data of about 45 GB may be read or written.

Now referring back to FIG. 1, an operation of the optical pickup of the first preferred embodiment will be described. The light source 110 of a laser diode generates laser beams that pass though the collimator lens 120 to become collimated beams. The collimated beams pass through the beam splitter 140 and then enter the SIL 180 and the substrate 201 of the optical disc to be focused on the signal recording surface 202 of the optical disc.

Figure 5:
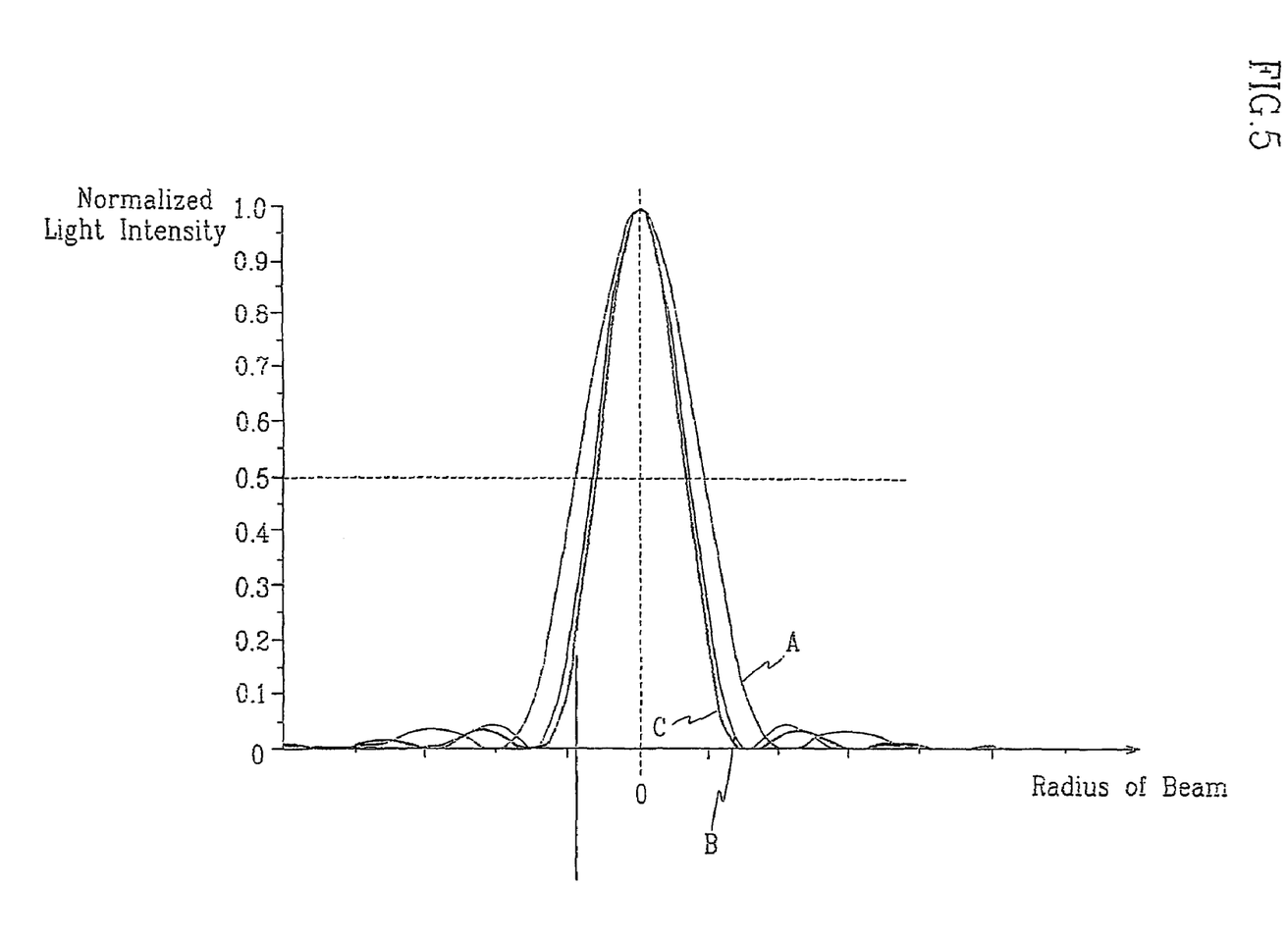
FIG. 5 shows a beam profile of a light spot on a signal recording surface of the optical disc.

The SIL 180 is nearly in contact with the optical disc 200, and even if an air gap exists between the SIL 180 and the disc 200, it merely becomes an order of magnitude of the wavelength of the light source, within the range of a few wavelengths of the light. Therefore, an extremely small light spot may be obtained on the signal recording surface. These characteristics are shown in FIG. 5, in which each curve represents a beam profile of the light spot. In the drawing, curve A is an ideal beam profile when a numerical aperture NA is 1.0, while curve B is a beam profile of a maximum numerical aperture $NA_{max}$=1.118, as calculated above when the air gap is about 1.0 wavelength of the light. Curve C is a beam profile of a maximum numerical aperture $NA_{max}$=1.118, when the SIL comes in contact with the optical disc. It is noted that the entire optical system is not affected under the assumption that the SIL is in contact with the optical disc when the air gap is in the range of a few wavelengths, conjecturing from the fact that curve B is nearly coincident with curve C in FIG. 5.

Even if the SIL 180 is not in perfectly contact with the optical disc 200 (i.e., the air gap exists), the light transmits through the gap by the quantum mechanic phenomenon, bearing no relation to the fact that an incident angle is a critical angle of total reflection. This is referred to as the near-field effect when using a solid immersion lens (See Eugene Hecht, Optics, Addison-Wesley Publishing Company, 2nd edition, pp 107–108).

Then, the focused light on the signal recording surface 202 diffracts or reflects from the surface 202, passes through the SIL 180, and then enters the beam splitter 140. The light is reflected from the beam splitter 140, enters the field lens 220, and then enters the photodetector 240. The photodetector 240 demodulates the incident light and reproduces information signals.

Figure 6:
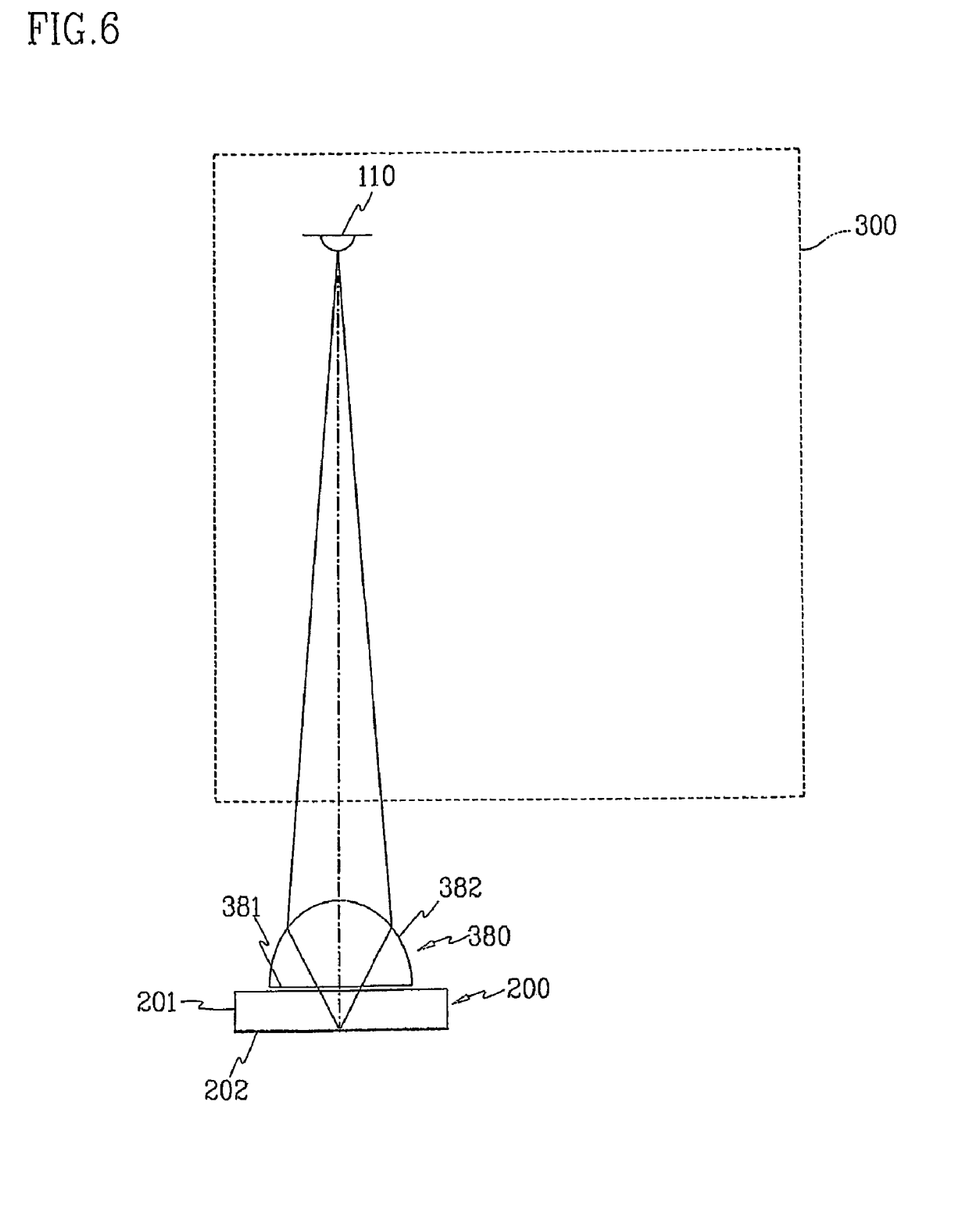
FIG. 6 shows a second preferred embodiment of the present invention.

Referring now to FIG. 6, an optical pickup apparatus according to the second preferred embodiment will be described. The first preferred embodiment relates to an infinite optical system in which collimated light beams enters into a SIL, while the second preferred embodiment is directed to a finite optical system in which a divergent light enters into a SIL. The apparatus of the second preferred embodiment is similar to that of the first preferred embodiment as shown in FIG. 1 in that the apparatus comprises optical elements that may be depicted as parts of an optical module 300 such as a laser diode for a light source 110, a beam splitter 140, a field lens 220, and a photodetector 240. In the apparatus of the second preferred embodiment, however, the diverging light from the laser diode of the light source 110 enters a SIL 380 through a beamsplitter without passing through a collimator lens. The condenser objective lens is also not used in the second preferred embodiment, as in the first preferred embodiment.

In the apparatus, the SIL 380 is placed on the optical path between the optical module 300 and the optical disc 200. The SIL 380 has a first surface 381 that is a plane and faces a substrate 201 of the optical disc 200 and is closely spaced therefrom, and a second surface 382 that is curved and faces the optical module 300.

The laser diode as a light source 110 in the apparatus is generally provided as a diode module having a protective window. That is, light diverging from a light-emitting diode chip passes through the protective window, and then enters into the SIL 380. Even though the protective window in the diode module has a thickness of only about 0.25 mm, it must be considered in the finite optical system of the second embodiment. Accordingly, the protective window is considered as a design factor when the second aspherical surface of the SIL 380 is designed, and FIG. 7 will be referred to hereinafter in an explanation thereof.

Figure 7:
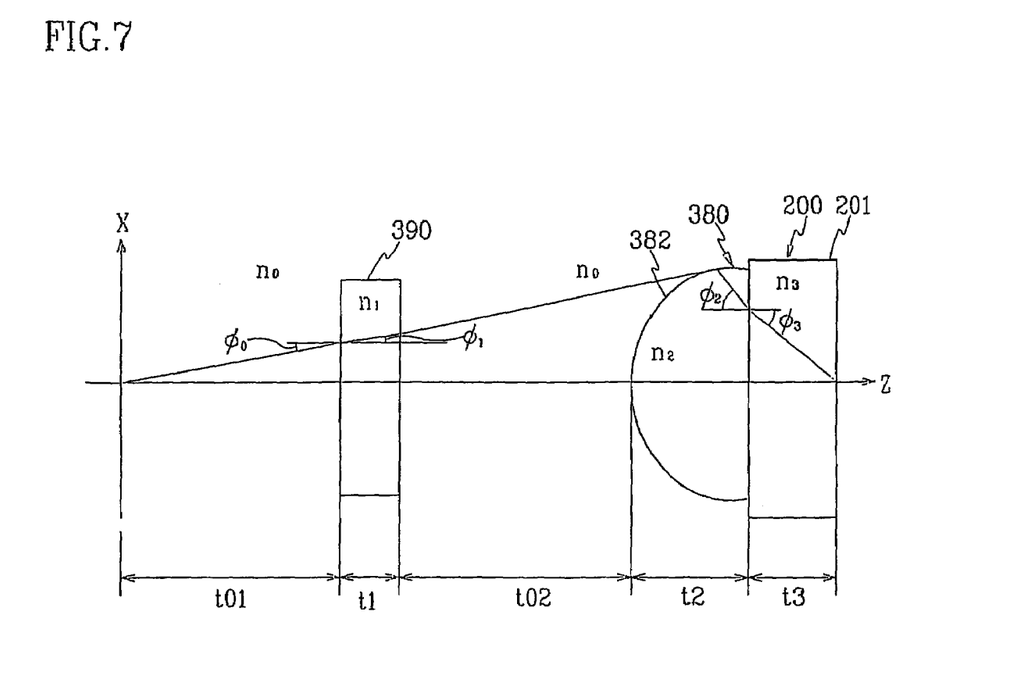
FIG. 7 illustrates an optical path of a ray in a solid immersion lens (SIL) and an optical disc of FIG. 6.

As shown in FIG. 7, an optical axis is a z-axis; a radial direction normal to the optical axis is an x-axis; the refractive indices of air, the protective window 390 of the laser diode, the SIL 380, and the substrate 201 of the optical disc are n0, n1, n2, and n3, respectively; the distance between the laser diode and the protective window is t01; the thickness of the protective window is t1; the distance between the protective window and a vertex of the SIL is t02; the thicknesses of the SIL and the optical disc are t2 and t3, respectively; the incident and refractive angles of the incident ray to the protective window are φ0 and φ1, respectively; and the incident angles to the first surface of the SIL and the signal recording surface are φ2 and φ3, respectively. It is further assumed that the optical paths of all rays that pass through the protective window 390, the SIL 380, and the substrate 201 and then enter the signal recording surface 202 are the same, and Snell's law of refraction are considered to obtain Formulas 13 and 14.

Accordingly, the second surface (z, x) of the SIL satisfies Formulas 13 and 14, allowing making a divergent beam a light spot. For the purpose of easy explanation, the formulas are expressed as two-dimensional equations, but those ordinarily skilled in the art may modify the formulas to be three-dimensional, simply by substituting $x^2+y^2$ for $x^2$.

$$\phi 1 = \sin^{-1}\left(\frac{n0}{n1}\sin(\phi 0)\right), \phi 2 = \sin^{-1}\left(\frac{n3}{n2}\sin(\phi 3)\right) \quad \text{FORMULA 13}$$

$$x=(z-t1)\tan(\phi 0)+t1\tan(\phi 1)=(t01+t02+t1+t2-z)\tan(\phi 2)+t3\tan(\phi 3) \quad \text{FORMULA 14}$$

$$\frac{n1t1}{\cos\phi 1} + \frac{n0(z-t1)}{\cos\phi 0} + \frac{n2(t01+t1+t02+t2-z)}{\cos\phi 2} + \frac{n3t3}{\cos\phi 3} = n0t01+n1t1+n0t02+n2t2+n3t3 \quad \text{FORMULA 15}$$

Formula 15 is rearranged to the following formula.

$$\frac{n0t01}{\cos\phi 0} + \frac{n1t1}{\cos\phi 1} + \frac{n0(x-t01\tan\phi 0-t1\tan\phi 1)}{\sin\phi 0} + \frac{n2(x-t3\tan\phi 3)}{\sin\phi 2} + \frac{n3t3}{\cos\phi 3} = n0t01+n1t1+n0t02+n2t2+n3t3 \quad \text{FORMULA 16}$$

Formulas 13 and 14, and 15 or 16, are rearranged to the following Formulas 17 to 19.

$$x = (z-t1)\tan\phi 0 + t1\tan\left(\sin^{-1}\left(\frac{n0}{n1}\sin\phi 0\right)\right) \quad \text{FORMULA 17}$$

$$z = \frac{t1(\tan\phi 0 - \tan\phi 1) + t3\tan\phi 3 + TX\tan\phi 2}{\tan\phi 0 + \tan\phi 2} \quad \text{FORMULA 18}$$

where $TX=t01+t1+t02+t2$.

$$\frac{CO - \frac{n1t1}{\cos\phi 1} - \frac{n3t3}{\cos\phi 3} + \frac{n0t1}{\cos\phi 0} - \frac{n2TX}{\cos\phi 2}}{\frac{n0}{\cos\phi 0} - \frac{n2}{\cos\phi 2}} = \quad \text{FORMULA 19}$$

$$\frac{t1(\tan\phi 0 - \tan\phi 1) + t3\tan\phi 3 + TX\tan\phi 2}{\tan\phi 0 + \tan\phi 2}$$

where $CO=n0t01+n1t1+n0t02+n2t2+n3t3$.

Accordingly, z in Formulas 18 and 19 may be represented by a function of φ0 or φ1, so that x is expressed by a function of z only.

For example, in the case of n0=1.00, n1=1.55, n2=1.80, n3=1.52, t01+t02=7.0 mm, a thickness of the protective window t1=0.25 mm, t2=1.5 mm, and t3=1.2 mm, the effective radius of the SIL is about 1.65 mm and the maximum effective numerical aperture $NA_{max}$ becomes about 1.38.

Another example is given for n0=1.0003, n1=1.55, n2=1.80, n3=1.52, t01+t02=7.0 mm, t1=0.25 mm, t2=1.5 mm, and t3=0.6 mm, wherein the effective radius of the SIL is about 1.19 mm and the maximum effective numerical aperture $NA_{max}$ becomes about 1.36. When the thickness of the optical disc t3=0.1 and the other conditions are maintained, the effective radius is about 0.83 mm and the maximum effective numerical aperture $NA_{max}$ that may be obtained is about 1.34. In the case of t3=0.1 mm and t2=1.8 mm, ceteris paribus, the effective radius of the SIL is about 0.97 mm, and the effective numerical aperture is about 1.28.

It is therefore noted that the thicker the substrate of the optical disc, the larger the effective radius of the SIL, for a specific effective numerical aperture.

The operation of the optical pickup of the second preferred embodiment will now be described. The light source 110 of a laser diode generates laser beams that pass though the protective window 390, a beamsplitter (not shown), and the SIL 180, and then enter the substrate 201 of the optical disc to be focused on the signal recording surface 202 of the optical disc. The focused light diffracts and reflects from the signal recording surface 202, and then enters a photodetector (not shown) through the SIL 180, similar to the description with respect to the first preferred embodiment. Further, since the optical pickup apparatus uses a direct divergent beam from the laser diode without any collimator lens, it may be more compact and light-weight.

Even if the above description is explained for perfect contact between the SIL and the optical disc, it is possible to adapt the description to the case in which an air gap may exist between the SIL and the optical disc, which ranges within a few wavelength of light, owing to the near-field effect.

Figure 8:
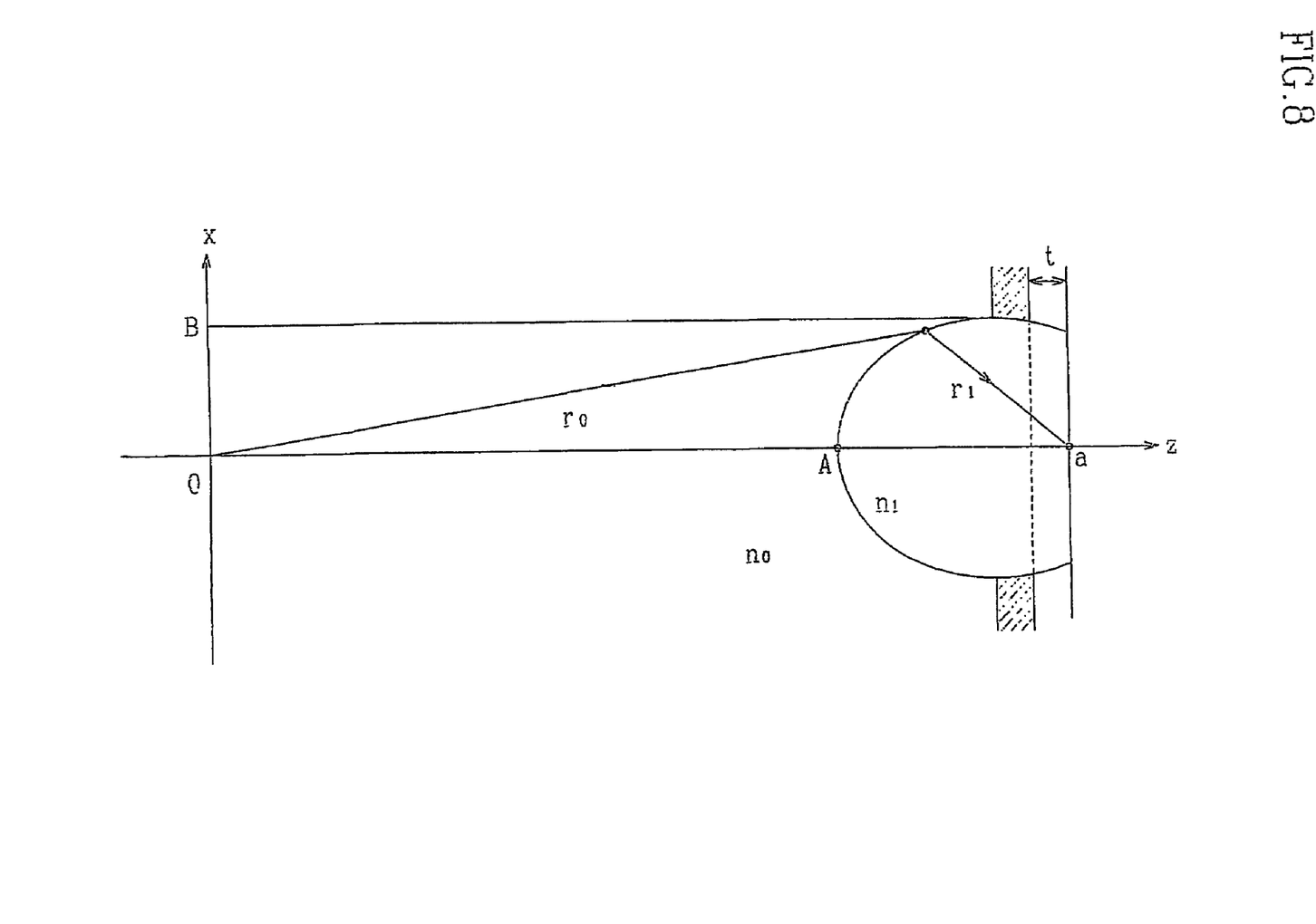
FIG. 8 illustrates the shape of the SIL according to the second preferred embodiment when a refractive index of the SIL is the same as that of the optical disc.

Next, referring to FIG. 8, the optical module without any protective window (i.e., ti=0; or the refractive index of the protective window is identical with that of air, n1=n0) before the SIL will be considered. When the refractive index of the substrate is identical to that of the SIL (i.e., n2=n3), the second surface of the SIL is a specific surface, a so-called Cartesian oval (See R. K. Luneburg, Mathematical Theory of Optics, pp.129–131).

Now, referring to FIG. 8, the Cartesian oval will be explained. Let a definite point (position of the light source) be an origin O, an optical path of a ray from the origin in the region having a refractive index n0 be r0, and an optical path in the region having a refractive index n0 be r1. When the assumption that all optical paths of rays from the origin are the same is valid, the following equation is established. As in the aforementioned case, the equations are expressed as two-dimensional equations for the purpose of easy explanation, but those ordinarily skilled in the art may modify the formulas to be three-dimensional, simply by substituting $x^2+y^2$ for $x^2$.

$$n0\sqrt{x^2+z^2}+n2\sqrt{x^2+(z-a)^2}=\text{constant}=n0A+n2(a-A) \quad \text{FORMULA 20}$$

$$r1=\sqrt{x^2+(z-a)^2}, r0=\sqrt{x^2+z^2} \quad \text{FORMULA 21}$$

The curved surface that satisfies Formulas 20 and 21 is called a Cartesian oval. When the thickness of the substrate is set to be t3, the thickness of the SIL t2 becomes (a-A-t3). Further, a lens holder for holding the SIL 180 supports its periphery at an area between a vertex on the plane normal to the optical axis and the substrate surface (hatched portion of FIG. 8), so that the effectiveness of the light may be maximized.

In the second preferred embodiment, when an optical disc such as a CD having a thickness of 1.2 mm is used, the refractive index of air n0 is 1.0, and the refractive indices of the substrate 201 and the SIL 180 are both 1.50; and a distance A between the origin and the vertex, a distance a between the origin and the focus, and the maximum radius B of the Cartesian oval are 20.5 mm, 24 mm, and 1.513 mm, respectively. In this case, the numerical aperture Na becomes 1.047, resulting in a larger numerical aperture than that (1.0) of the conventional pickup apparatus of FIGS. 6–7.

When an optical disc such as a DVD having a thickness of 0.6 mm is used, the refractive index of air no is 1.0, and the refractive indices of the substrate 201 and the SIL 180 are both 1.50; and a distance A between the origin and the vertex, a distance a between the origin and the focus, and the maximum radius B of the Cartesian oval are 16.9 mm, 18.98 mm, and 0.902 mm, respectively. In this case, the numerical aperture Na becomes 1.018, resulting in a larger numerical aperture than that (1.0) of the conventional pickup apparatus of FIGS. 6–7.

Now, referring back to FIG. 6, a light source 110 of a laser diode generates a divergent laser beam, which passes through the beamsplitter (not shown), and then enters the SIL 180 and the substrate 201 of the optical disc 200 to focus on the signal recording surface 202. The focused light diffracts and reflects from the signal recording surface 202, and then enters a photodetector (not shown) through the SIL 180, similar to the description with respect to the first preferred embodiment. Further, since the optical pickup apparatus uses a direct divergent beam from the laser diode without any collimator lens, it may be more compact and light-weight.

Figure 9A:
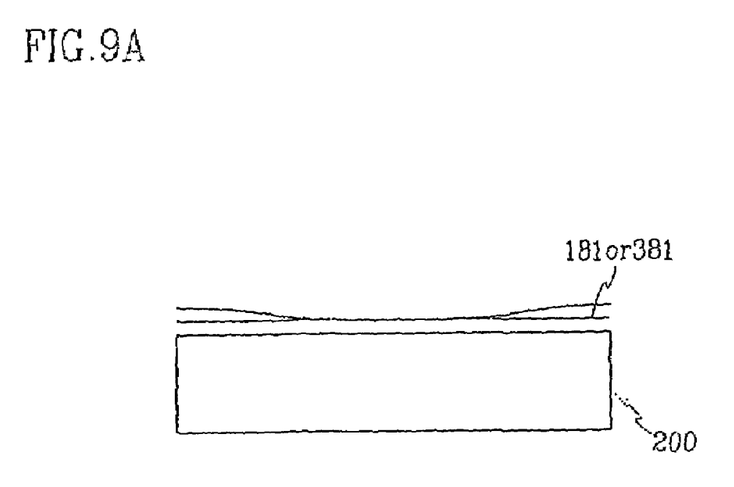
FIGS. 9a and 9b illustrate the second surface of the SIL.
Figure 9B:
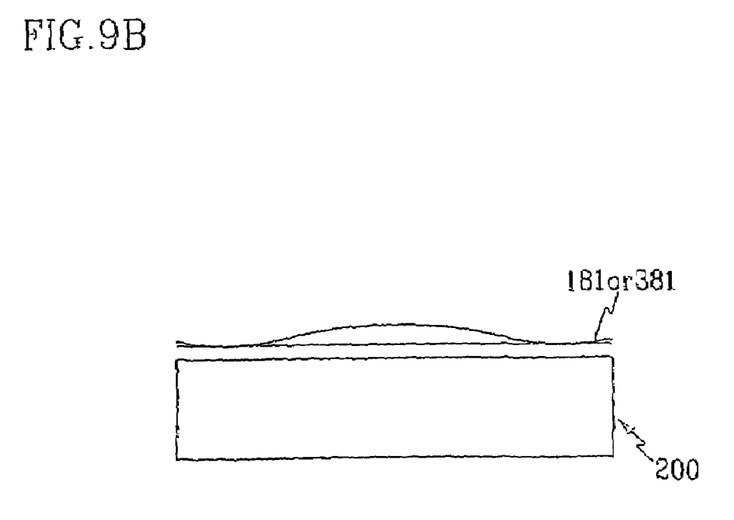

In the first or second preferred embodiment, the first surface of the SIL is explained as an ideal plane. However, it is possible that the first surface is a plane that ranges within an effective radius, or any curved surface (See FIGS. 9a and 9b.). The effective radius $r_{eff}$ is obtained by the following formula.

$$r_{eff} = t_{substrate}\tan\psi = t_{substrate}\tan\left[\sin^{-1}\left(\frac{NA}{n_{substrate}}\right)\right] \quad \text{FORMULA 22}$$

where $t_{substrate}$ is a thickness of the substrate of the optical disc, $\psi$ is an incident angle of the optical disc, NA is an effective numerical aperture, and $n_{substrate}$ is a refractive index of the substrate of the optical disc.

As described above, a plane surface is ideal and general within an effective radius. In a practical case, however, the continuous surface in which the difference between the highest point and the lowest point ranges within several wavelengths of the light is considered as a plane surface. Accordingly, a radius of curvature in the first surface is useful in a range as follows:

$$R - \sqrt{(R^2 - r_{eff}^2)} \leq \text{wavelength of the light}$$

The radius of curvature may be either positive as shown in FIG. 9a, or negative as shown in FIG. 9b.

For example, when a radius of the curve is 1000 mm and an effective radius is 1 mm, the difference between the highest point and the lowest point within the effective radius is 0.0005 mm, so that the effective radius is suitable for a 650 nm-wavelength system.

In practice, a curving surface rather than a flat surface is efficient and precise in mass production using metal molding techniques. When the light enters into an air gap between the SIL and the optical disc with an angle of more than the critical angle of the total internal reflection, the light propagates with an electric field ratio $e^{-bz}$ to the optical disc. Therefore, the larger the air gap, the less the light intensity on the disc. The attenuation coefficient b by the near-field effect is as follows:

$$b = 2\pi\sqrt{n_{SIL}sin^2\psi - 1} \quad \text{FORMULA 23}$$

where $\psi$ is an incident angle of the ray that enters into the first surface 181 of the SIL.

When light enters into the air gap with an angle of less than the critical angle, the light refracts according to the general Snell's refraction law, similar with the above. Therefore, since a curved surface with a considerably large radius of curvature is approximate to an ideal plane, it may be substituted with the planar surface of the SIL, resulting in an advantage of easy manufacturing.

The optical pickup apparatus according to the present invention may enhance endurance of optical recording media as well as the apparatus, by reading or writing information while facing a substrate of the media.

The apparatus includes a single solid immersion lens as an objective lens system without any condenser objective lenses, resulting in a simple and compact structure.

Further, since the light spot on the media may be reduced by the solid immersion lens having a numerical aperture of over 1.0, the apparatus may conform to high-density read/write heads.

It will be apparent to those skilled in the art that various modifications and variations can be made to the device of the present invention without departing from the spirit and scope of the invention. The present invention covers the modifications and variations of this invention provided they come within the scope of the appended claims and their equivalents.

What is claimed is:

1. An optical pickup apparatus for recording or reproducing data on a signal recording surface of a high-density optical medium that has the signal recording surface and at least one substrate, comprising:

an optical module for generating and emitting collimated beams and receiving reflected beams from the optical medium;

a solid immersion lens (SIL), arranged on an optical path between the optical module and the optical medium, having a first surface being planar and facing and closely spaced from the substrate of the optical medium, and a second surface being aspherical and facing the optical module, with the substrate being interposed between the first surface of the SIL and the recording surface of the optical medium, wherein the collimated beams from the optical module enter the second surface of the SIL, and are then focused through the SIL and the substrate onto the signal recording surfaces, and wherein a resultant numerical aperture of the SIL is proportional to a refractive index of the substrate of the optical medium.

2. The apparatus as recited in claim 1, wherein when a z-axis represents an optical axis of the optical module and the SIL, and an x-axis represents a radial axis normal to the optical axis, the second surface of the SIL satisfies the following conditions:

$$z = \frac{n1t1\left(1 - \frac{1}{\cos(\sin^{-1}(nr\sin\theta 2))}\right) + n2t2\left(1 - \frac{1}{\cos\theta 2}\right)}{n0 - \frac{n1}{\cos(\sin^{-1}(nr\sin\theta 2))}}$$

$$x = t2\tan\theta 2 + \left(t1 - \frac{n1t1\left(1 - \frac{1}{\cos(\sin^{-1}(nr\sin\theta 2))}\right) + n2t2\left(1 - \frac{1}{\cos\theta 2}\right)}{n0 - \frac{n1}{\cos(\sin^{-1}(nr\sin\theta 2))}}\right)\tan(\sin^{-1}(nr\sin\theta 2))$$

where n0, n1, and n2 are refractive indices of air, the SIL, and the substrate of the optical medium, respectively;

η2 is an incident angle to the signal recording surface through the SIL;

nr is a ratio of the refractive index n2 of the substrate to the refractive index n1 of the SIL (=n2/n1); and t1 and t2 are thicknesses of the SIL and the substrate, respectively.

3. The apparatus as recited in claim 1, wherein the SIL is made of an optical material whose refractive index is identical to that of the substrate, and the second surface of the SIL comprises an ellipsoidal surface.

4. The apparatus as recited in claim 3, wherein the ellipsoidal surface of the
second surface satisfies the following conditions regarding a semi-major axis A, a semi-minor axis B, and an eccentricity e:
A=a n1/(n1+n0)
B=a√((n1−n0)/(n1+n0))
e=a n0/(n1+n0)
where a is a distance between a vertex and a focus on a major axis of the ellipsoidal surface;
n0 and n1 are refractive indices of air and the substrate of the optical medium, respectively.

5. The apparatus as recited in claim 4, wherein a thickness of the SIL is (a-t) when a thickness of the substrate is t.

6. The apparatus as recited in claim 3, wherein the maximum value $NA_{max}$ of the effective numerical aperture of the SIL, is given by the following equation:

$$NR_{max} = \sqrt{(n1^2 - n0^2)}$$

where n0 and n1 are refractive indices of air and the substrate of the optical medium, respectively.

7. The apparatus as recited in claim 1, further comprising:
a lens holder for holding the SIL at the vertex of a minor axis of the ellipsoidal surface of the second surface of the SIL, thereby maximizing light efficiency.

8. The apparatus as recited in claim 1, wherein the first surface of the SIL comprises a planar surface within an effective radius $r_{eff}$ that is defined as follows:

$$r_{eff} = t_{substrate}\tan\psi = t_{substrate}\tan\left[\sin^{-1}\left(\frac{NA}{n_{substrate}}\right)\right]$$

where $t_{substrate}$ is a thickness of the substrate of the optical medium;

ψ is an incident angle to the substrate of the optical medium;

NA is an effective numerical aperture; and $n_{substrate}$ is a refractive index of the substrate of the optical medium.

9. The apparatus as recited in claim 1, wherein the first surface of the SIL is not a perfect planar surface and it has a radius of curvature R that is defined as follows:

$$R - \sqrt{(R^2 - r_{eff}^2)} \leq \lambda$$

where λ is a wavelength of beams and $r_{eff}$ is defined as follows:

$$r_{eff} = t_{substrate}\tan\psi = t_{substrate}\tan\left[\sin^{-1}\left(\frac{NA}{n_{substrate}}\right)\right]$$

where $t_{substrate}$ is a thickness of the substrate of the optical medium;

ψ is an incident angle to the substrate of the optical medium;

NA is an effective numerical aperture; and $n_{substrate}$ is a refractive index of the substrate of the optical medium.

10. An optical pickup apparatus for recording or reproducing data on a signal recording surface of a high-density optical medium that has the signal recording surface and at least one substrate, comprising:
an optical module comprising a light source, for generating and emitting divergent beams and receiving reflected beams from the optical medium;
a solid immersion lens (SIL), arranged on an optical path between the optical module and the optical medium, having a first surface being planar and facing and closely spaced from the substrate of the optical medium, and a second surface being aspherical and facing the optical module, with the substrate being interposed between the first surface of the SIL and the recording surface of the optical medium, the SIL being made of an optical material whose refractive index is identical to that of the substrate of the optical medium,
wherein the divergent beams from the optical module enter the second surface of the SIL, and are then focused through the SIL and the substrate onto the signal recording surfaces,
and wherein a resultant numerical aperture of the SIL is proportional to a refractive index of the substrate of the optical medium.

11. The apparatus as recited in claim 10, further comprising:
a transparent planar window in the optical module, so that the divergent beams pass through the window before the beams exit from the optical module, wherein when a z-axis represents an optical axis of the optical module and the SIL, and an x-axis represents a radial axis normal to the optical axis, the second surface of the SIL satisfies the following conditions:

$$x = (z - t1)\tan\phi 0 + t1\tan\left(\sin^{-1}\left(\frac{n0}{n1}\sin\phi 0\right)\right)$$

$$z = \frac{t1(\tan\phi 0 - \tan\phi 1) + t3\tan\phi 3 + TX\tan\phi 2}{\tan\phi 0 + \tan\phi 2}$$

$$\frac{C0 - \frac{n1 t1}{\cos\phi 1} - \frac{n3 t3}{\cos\phi 3} + \frac{n0 t1}{\cos\phi 0} - \frac{n2 TX}{\cos\phi 2}}{\frac{n0}{\cos\phi 0} - \frac{n2}{\cos\phi 2}} =$$

$$\frac{t1(\tan\phi 0 - \tan\phi 1) + t3\tan\phi 3 + TX\tan\phi 2}{\tan\phi 0 + \tan\phi 2}$$

where n0, n1, n2, and n3 are refractive indices of air, the window, the SIL, and the substrate of the optical medium, respectively;

t1, t2, and t3 are thicknesses of the window, the SIL, and the substrate, respectively;

t01 and t02 are distances between the light source and the window and between the window and the vertex of the SIL, respectively;

φ0 and Φ1 are an incident angle and a refractive angle of a ray entering the window, respectively;

φ3 is an incident angle of a ray entering the substrate; and TX=t01+t1+t02+t2, and C0=n0 t01+n1 t1+n0 t02+n2 t2+n3 t3.

12. The apparatus as recited in claim 10, wherein a z-axis represents an optical axis of the optical module and the SIL, and an x-axis represents a radial axis normal to the optical axis and wherein the second surface of the SIL is a Cartesian oval that is represented by the following equation:

$$n0\sqrt{(x^2+z^2)} + n1\sqrt{(x^2+(z-a)^2)} = n0A + n1(a-A)$$

where A is a distance between the light source and the vertex of the second surface of the SIL;

$$x = (z - t1)\tan\phi 0 + t1\tan\left(\sin^{-1}\left(\frac{n0}{n1}\sin\phi 0\right)\right)$$

$$z = \frac{t1(\tan\phi 0 - \tan\phi 1) + t3\tan\phi 3 + TX\tan\phi 2}{\tan\phi 0 + \tan\phi 2}$$

a is a distance between the light source and the focus of the second surface of the SIL; and n0 and n1 are refractive indices of air and the substrate of the optical medium, respectively.

13. The apparatus as recited in claim 12, wherein a thickness of the SIL is (a−A−t) when a thickness of the substrate is t.

14. The apparatus as recited in claim 12, further comprising:

a lens holder for holding the SIL at the vertex of a minor axis of the second surface of the SIL, thereby maximizing the light efficiency.

15. The apparatus as recited in claim 10, further comprising:

a lens holder for holding the SIL at the vertex of a minor axis of the second surface of the SIL, thereby maximizing the light efficiency.

16. The apparatus as recited in claim 10, wherein the first surface of the SIL comprises a planar surface within an effective radius $r_{\mathit{eff}}$ that is defined as follows:

$$r_{\mathit{eff}} = t_{\mathit{substrate}}\tan\psi = t_{\mathit{substrate}}\tan\left[\sin^{-1}\left(\frac{NA}{n_{\mathit{substrate}}}\right)\right]$$

where $t_{\mathit{substrate}}$ is a thickness of the substrate of the optical medium;

Ψ is an incident angle to the substrate of the optical medium;

NA is an effective numerical aperture; and $n_{\mathit{substrate}}$ is a refractive index of the substrate of the optical medium.

17. The apparatus as recited in claim 10, wherein the first surface of the SIL is not a perfect planar surface and has a radius of curvature R that is defined as follows:

$$R - \sqrt{(R^2 - r_{\mathit{eff}}^2)} \leq \lambda$$

where λ is a wavelength of beams and reff is defined as follows:

$$r_{\mathit{eff}} = t_{\mathit{substrate}}\tan\psi = t_{\mathit{substrate}}\tan\left[\sin^{-1}\left(\frac{NA}{n_{\mathit{substrate}}}\right)\right]$$

where $t_{\mathit{substrate}}$ is a thickness of the substrate of the optical medium;

ψ is an incident angle to the substrate of the optical medium;

NA is an effective numerical aperture; and $n_{\mathit{substrate}}$ is a refractive index of the substrate of the optical medium.

* * * * *